US008351561B2

(12) United States Patent
Hashemian et al.

(10) Patent No.: US 8,351,561 B2
(45) Date of Patent: Jan. 8, 2013

(54) ADVANCED DIGITAL CONTROL ROD POSITION INDICATION SYSTEM WITH ROD DROP MONITORING FOR NUCLEAR POWER PLANTS

(75) Inventors: Hashem M. Hashemian, Knoxville, TN (US); Gregory W. Morton, Knoxville, TN (US); Brent D. Shumaker, Knoxville, TN (US); Danny D. Beverly, Knoxville, TN (US); Casey D. Sexton, Knoxville, TN (US)

(73) Assignee: Analysis and Measurement Services Corporation, Knoxville, TN (US)

( * ) Notice: Subject to any disclaimer, the term of this patent is extended or adjusted under 35 U.S.C. 154(b) by 448 days.

(21) Appl. No.: 12/351,753

(22) Filed: Jan. 9, 2009

(65) Prior Publication Data

US 2009/0252272 A1 Oct. 8, 2009

Related U.S. Application Data

(60) Provisional application No. 61/020,054, filed on Jan. 9, 2008.

(51) Int. Cl.
*G21C 17/00* (2006.01)

(52) U.S. Cl. .......................... 376/258; 376/259; 376/245
(58) Field of Classification Search .................. 376/240, 376/258, 259, 233, 215, 245
See application file for complete search history.

(56) References Cited

U.S. PATENT DOCUMENTS

| 4,646,012 | A | * | 2/1987 | Feilchenfeld et al. | ... 324/207.12 |
| 4,668,465 | A | * | 5/1987 | Boomgaard et al. | .......... 376/216 |
| 5,408,508 | A | * | 4/1995 | Federico et al. | .............. 376/258 |
| 5,563,922 | A | * | 10/1996 | Beltz et al. | ..................... 376/258 |
| 5,841,824 | A | * | 11/1998 | Graham | ........................ 376/258 |
| 6,236,699 | B1 | * | 5/2001 | Ridolfo | ......................... 376/259 |
| 6,404,835 | B1 | | 6/2002 | Morton et al. | |
| 6,408,508 | B1 | * | 6/2002 | Farnworth et al. | .............. 29/840 |
| 6,606,367 | B2 | * | 8/2003 | Halluin et al. | ................ 376/245 |

* cited by examiner

*Primary Examiner* — Ricardo Palabrica
(74) *Attorney, Agent, or Firm* — Pitts & Lake, P.C.

(57) ABSTRACT

An advanced digital rod position indication (ADRPI) system having rod drop monitoring capability. When a reactor trip occurs, the ADRPI system derives the rod drop time from the signals induced in the detector coils by the falling drive rods. The ADRPI system is linked to the reactor trip breaker to provide a reference point to allow accurate timing of the rod drop times.

15 Claims, 11 Drawing Sheets

ADVANCED DIGITAL CONTROL ROD POSITION INDICATION SYSTEM WITH ROD DROP MONITORING FOR NUCLEAR POWER PLANTS

CROSS-REFERENCE TO RELATED APPLICATIONS

This application claims the benefit of U.S. Provisional Application No. 61/020,054, filed Jan. 9, 2008.

STATEMENT REGARDING FEDERALLY-SPONSORED RESEARCH OR DEVELOPMENT

Not Applicable

BACKGROUND OF THE INVENTION

1. Field of Invention

This invention relates to a digital rod position indication system for use in a nuclear power plant. More specifically, this invention relates to a digital rod position indication system capable of monitoring rod drop times during normal plant operation.

2. Description of the Related Art

In a Pressurized Water Reactor (PWR), the power level of the reactor 10 is controlled by inserting and retracting the control rods 12, which for purposes of this application include the shutdown rods, into the reactor core 14. The control rods are moved by the Control Rod Drive Mechanisms (CRDM), which are electromechanical jacks that raise or lower the control rods in increments. The CRDM includes a lift coil $DM_L$, a moveable gripper coil $DM_M$, and a stationary gripper coil $DM_S$ that are controlled by the Rod Control System (RCS) and a ferromagnetic drive rod that is coupled to the control rod and moves within the pressure housing 16. The drive rod includes a number of circumferential grooves at ⅝ inch intervals ("steps") that define the range of movement for the control rod. A typical drive rod contains approximately 231 grooves, although this number may vary. The moveable gripper coil mechanically engages the grooves of the drive rod when energized and disengages from the drive rod when de-energized. Energizing the lift coil raises the moveable gripper coil (and the control rod if the moveable gripper coil is energized) by one step. Energizing the moveable gripper coil and de-energizing the lift coil moves the control rod down one step. Similarly, when energized, the stationary gripper coil engages the drive rod to maintain the position of the control rod and, when de-energized, disengages from the drive rod to allow the control rod to move. The RCS includes the logic cabinet and the power cabinet. The logic cabinet receives manual demand signals from an operator or automatic demand signals from Reactor Control and provides the command signals needed to operate the shutdown and control rods according to a predetermined schedule. The power cabinet provides the programmed dc current to the operating coils of the CRDM.

Current PWR designs have no direct indication of the actual position of each control rod. Instead, step counters associated with the control rods are maintained by the RCS and rod position indication (RPI) systems to monitor the positions of the control rods within the reactor. The associated step counter is incremented or decremented when movement of a control rod is demanded and successful movement is verified. Because the step counter only reports the expected position of the control rod, certain conditions can result in the step counter failing and deviating from the actual position of the control rod. In certain situations where the actual position of the control rod is known, the step counter can be manually adjusted to reflect the actual position. However, if the actual position of the control rod is not known, a plant shutdown may be required so that the step counters to be initialized to zero while the control rods are at core bottom.

The RPI systems derive the axial positions of the control rods by direct measurement of drive rod positions. Currently both analog rod position indication (ARPI) systems and digital rod position indication (DRPI) systems are in use in PWRs. The conventional DRPI systems have been in service for over 30 years in nuclear power stations worldwide and are currently being used as the basis for the rod position indication systems in the new Westinghouse AP1000 designs.

A conventional DRPI system includes two coil stacks for each control rod and the associated DPRI electronics for processing the signals from the coil stacks. Each coil stack is an independent channel of coils placed over the pressure housing. Each channel includes 21 coils. The coils are interleaved and positioned at 3.75 inch intervals (6 steps). The DRPI electronics for each coil stack of each control rod are located in a pair of redundant data cabinets (Data Cabinets A and B). Although intended to provide independent verification of the control rod position, conventional DRPI systems are not accurate to fewer than 6 steps. The overall accuracy of a DRPI system is considered to be accurate within ±3.75 inches (6 steps) with both channels functioning and ±7.5 inches using a single channel (12 steps). In contrast to the conventional DRPI system, a conventional ARPI system determines the position based on the amplitude of the dc output voltage of an electrical coil stack linear variable differential transformer. The overall accuracy of a properly calibrated ARPI system is considered to be accurate within ±7.2 inches (12 steps). Neither conventional ARPI systems nor conventional DRPI systems are capable of determining the actual positions of the control rods.

It should be noted that for purposes of this application, the phrase "control rod" is used generically to refer to a unit for which separate axial position information is maintained, such as a group of control rods physically connected in a cluster assembly. The number of control rods varies according to the plant design. For example, a typical four-loop PWR has 53 control rods. Each control rod requires its own sets of coils having one or more channels and the DRPI electronics associated with each channel. Thus, in a typical four-loop PWR, the entire DPRI system would include 53 coil stacks, each having two independent channels, and 106 DPRI electronics units. Further, in this application, the phrase "coil stack" is used generically to refer to the detector coils associated with each control rod and should be understood to include either or both channels of detector coils. Thus, a measurement across a coil stack contemplates the value across both channels combined and/or the value across a single channel.

Unfortunately, aging and obsolescence issues have led to an increase in problems with conventional DRPI systems including analog card failures and coil cable connection problems that, in some cases, may result in unplanned reactor trips. These problems, along with plans for plant life extension, have prompted the industry to actively seek viable options to monitor the health and accuracy of the DRPI systems and/or to replace failing systems in order to ensure reliable plant operations for decades to come.

Beyond the technical problems of the conventional DRPI systems, regulatory issues exist. Many existing PWRs are approaching the end of qualified life for several components of the conventional DRPI systems during the next decade and are actively seeking replacement options at this time. There has been a significant push in recent years for plants to replace aging analog systems with digital systems made from commercially-available off-the-shelf parts. Using readily-available commercial parts provide plants more options for replacement in the future.

One concern for PWRs is ensuring that rod drop times meet regulation. In the event of a reactor trip, both the moveable gripper coil $DM_M$ and the stationary gripper coil $DM_S$ are de-energized releasing the control rods to gravity. The maximum allowable time for all rods to reach core bottom is prescribed by regulation and a PWR must periodically test the rod time to ensure compliance. Conventional rod drop testing occurs outside of normal plant operation with the rod drop being initiated by plant operators. Thus, in conventional rod drop testing, the start time is planned and, therefore, known.

One method for performing a conventional rod drop test involves fully withdrawing the control rods, deactivating the DRPI system, and releasing the control rods. As the ferromagnetic drive rods pass through the de-energized detector coils, a signal proportional to the velocity of the control rod is generated in each detector coil due to the magnetic field effects. These outputs are used to determine the rod drop time.

More recently, the assignee of the present invention has offered online rod drop testing, as disclosed in U.S. Pat. No. 6,404,835 (the '835 patent). The method of rod drop testing is accomplished by attaching a data acquisition unit to the reference test point $P_{TREF}$ of each data cabinet in order to sample the analog signal across the DRPI coil stack. The sampled analog data is then sent to a testing computer located outside containment at the rod control power cabinets. A filter applied to the sampled analog data removes the applied coil power and leaves the composite induced signal resulting from the drive rod passing through the coils (i.e., the rod drop trace) appearing at the reference test point. While this method of testing rod drop times does not require the plant to be taken offline as with the previous method, the rod drop tests occur outside of the normal plant operation. Thus, in the event of an actual reactor trip, there is no way to verify compliance with the regulation drop time limits.

BRIEF SUMMARY OF THE INVENTION

An advanced digital rod position indication (ADRPI) system having rod drop monitoring capability is described. When a reactor trip occurs, the ADRPI system derives the rod drop time from the signals induced in the detector coils by the falling drive rods. The ADRPI system is linked to the reactor trip breaker to provide a reference point to allow accurate timing of the rod drop times.

The ADRPI system can be implemented as a complete system in a new plant design or a supplemental system that works in conjunction with portions of a conventional DRPI system to monitor rod drop times in the event of a reactor trip. In one embodiment, the ADRPI system also provides rod position information with single step precision. The ADRPI system includes ADRPI electronics that are connected to and monitor the electrical signals from the plurality of detector coils. The ADRPI electronics include a data acquisition unit in communication with an interface device. The ADRPI data acquisition unit has a number of analog inputs equal to the number of coils in a single channel plus an additional input for the reference line. The electronic signals produced by each DRPI coil are sampled by ADRPI data acquisition unit. The interface transmits the sampled data to the ADRPI processing unit located outside containment.

The ADRPI system establishes a start time associated with a signal from the reactor trip breaker. One embodiment of the ADPRI system measures the signals of each detector coil available at the coil test points, which are on the low side of the voltage reference and filters out the ac line frequency component to obtain the low frequency component of the signal for each detector coil. To determine the rod drop time, the signal from at least the last detector coil are evaluated relative to the rod drop event start time. The rod drop event stop time occurs when the amplitude of signal from the bottommost detector coil returns to zero. When the low frequency components from all detector coils are used, they can be summed to produce a rod drop trace familiar to plant operators.

In an alternate embodiment where improved resolution position information is available, the rod drop time is established from the position information obtained by the ADRPI system. As the drive rod falls and ceases affecting the magnetic field produced by the excitation power source $V_{REF}$, the output voltage of each detector coil is maximized. Accordingly, the rod drop event time is measured from the time when the reactor trip occurs to the time when the output voltage of the bottommost coil is maximized.

In another embodiment, the rod drop information is derived by taking the derivative of the RMS voltage across the coil stacks to obtain the rod drop velocity. Finally, by using more than one technique to measure rod drop times, the results can be compared and used to validate the measurements.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An advanced digital rod position indication (ADRPI) system having rod drop monitoring capability is described in detail herein and illustrated in the accompanying figures. When a reactor trip occurs, the ADRPI system derives the rod drop time from the signals induced in the detector coils by the falling drive rods. The ADRPI system is linked to the reactor trip breaker to provide a reference point to allow accurate timing of the rod drop times.

Figure 1:
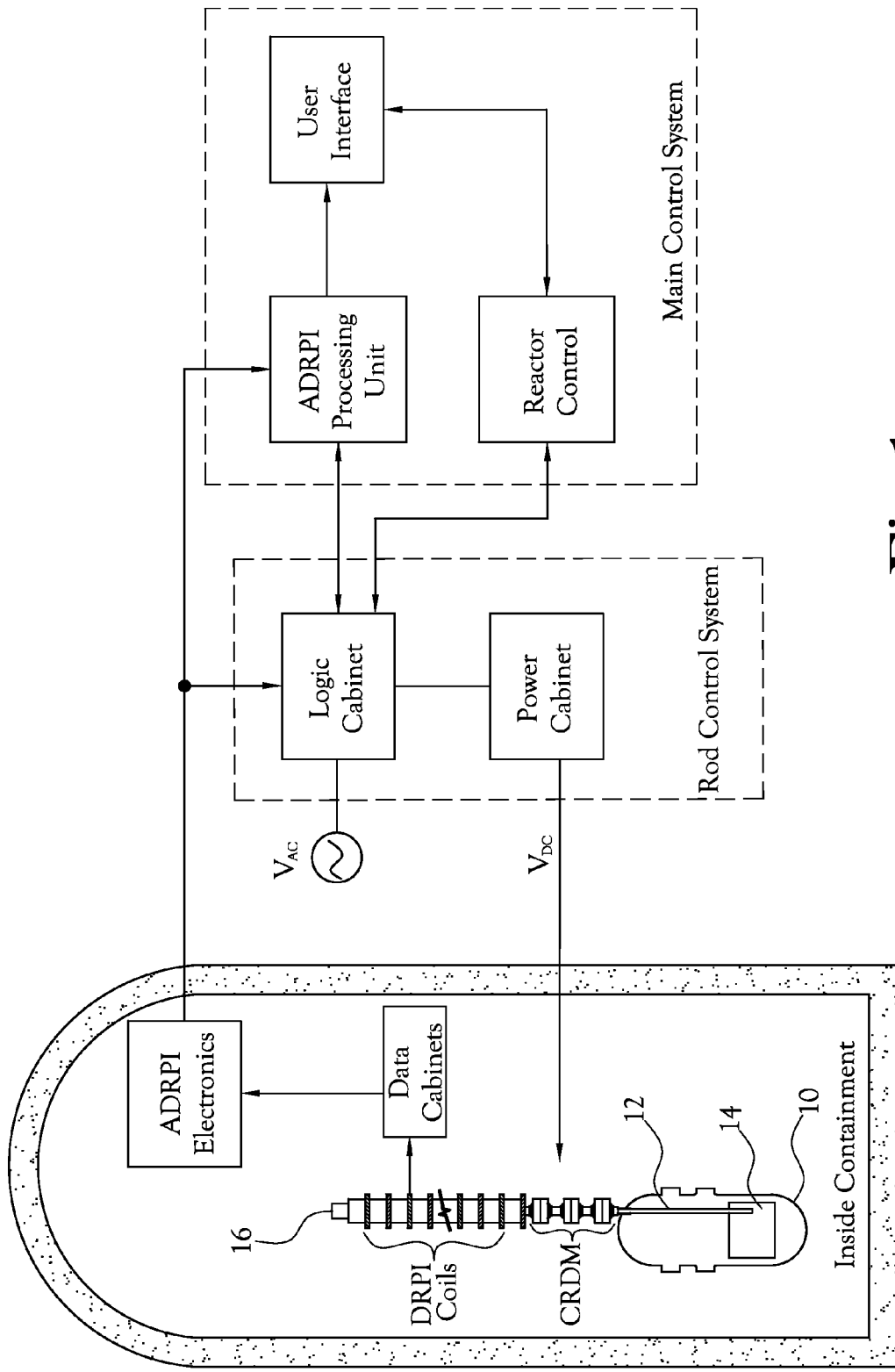
FIG. 1 is a block diagram of the advanced digital rod position indication (ADRPI) system in a pressurized water reactor.

FIG. 1 is a block diagram of an ADRPI system in a pressurized water reactor (PWR). A brief overview of the systems of a PWR that are relevant to the ADRPI system can be found in the description of the related art. The ADRPI system can be implemented as a complete system in a new plant design or a supplemental system that works in conjunction with portions of a conventional DRPI system to provide monitor rod drop times. In one embodiment, the ADRPI system also monitors rod position information with single step precision. In the illustrated embodiment, the ADRPI system includes the ADRPI electronics located inside containment and the ADRPI processing unit located outside containment in the main control room. The ADRPI electronics sample the electrical signals from the detector coils common to DRPI systems and transmit the sampled data to the ADRPI processing unit. The ADRPI processing unit evaluates the sampled data from the ADRPI electronics to derive the positions of the control rods. The position information generated by the ADRPI processing unit is displayed to the reactor operators via a user interface and may be used to verify the position information maintained by the step counters of the rod control system (RCS).

Figure 2:
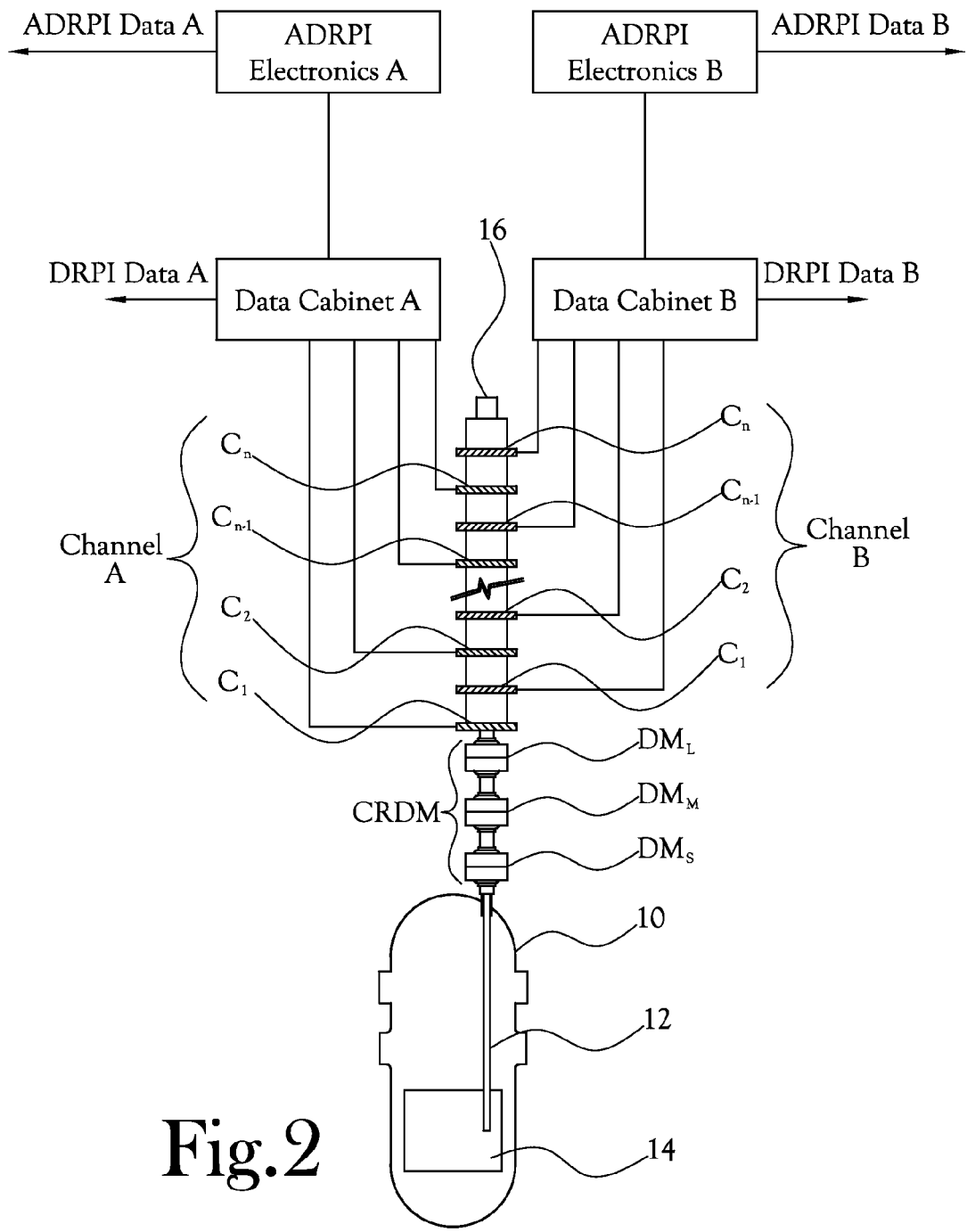
FIG. 2 is a block diagram of one embodiment of the inside containment portions of the ADRPI system.

FIG. 2 illustrates one embodiment of the ADRPI system used to retrofit plants with existing conventional DRPI systems. The conventional DRPI system consists of two redundant components (Data Cabinets A and B) located inside the containment area and in communication with the detector coils of the coil stacks and mounted on the rod control housings above the reactor. In this embodiment, the ADRPI electronics are connected to the data cabinets at a point between the input from the existing detector coils and the conventional DRPI electronics allowing the ADRPI electronics to sample the DRPI coil currents and convert them into digital signals. The digital signal is then transmitted to the ADRPI processing unit in the main control room.

Figure 3:
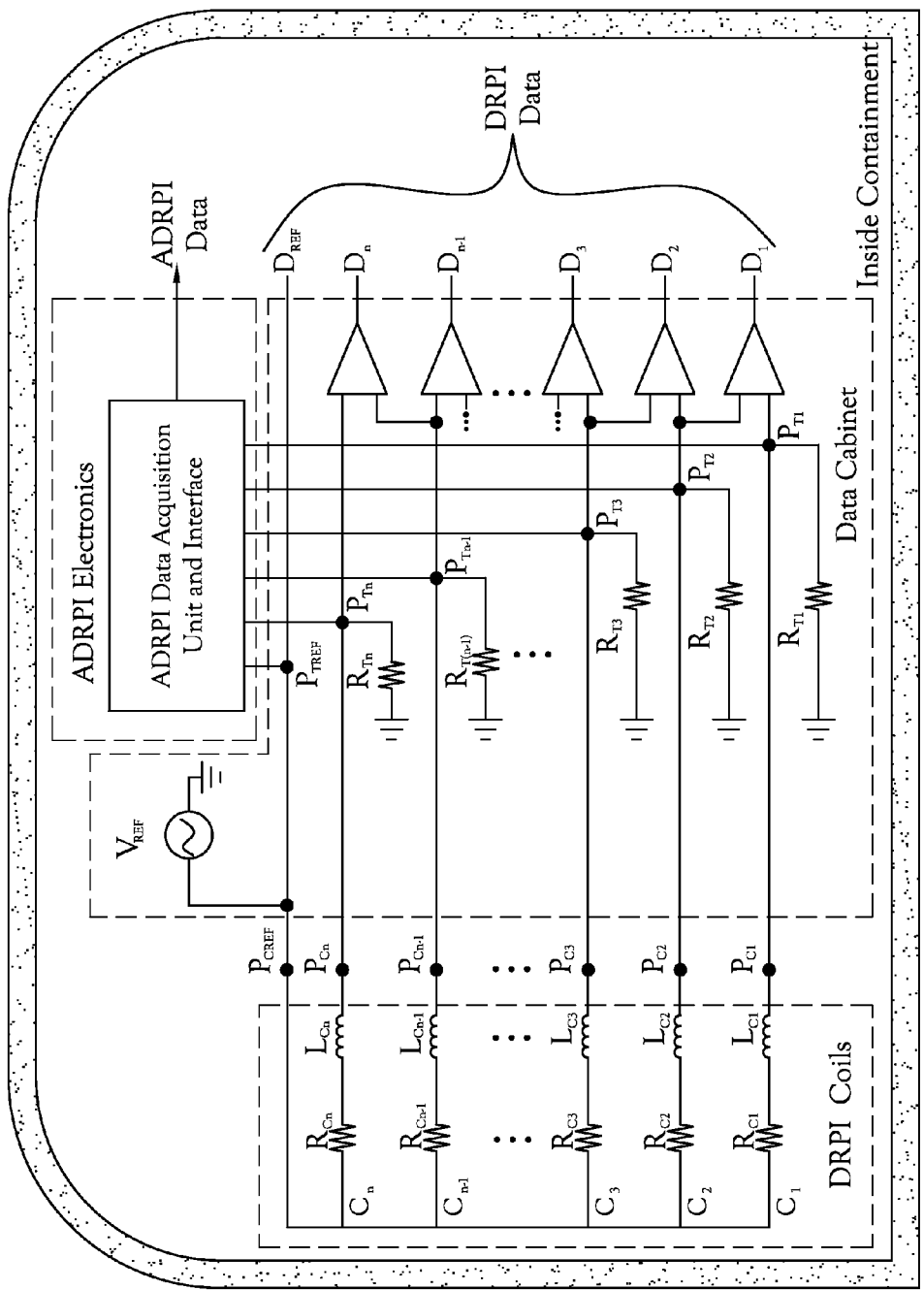
FIG. 3 shows of one embodiment of the ADRPI electronics retrofitted to an existing conventional DRPI system.

FIG. 3 is a diagram of one embodiment of the ADRPI electronics used in the retrofit application of FIG. 2. In this embodiment, the ADRPI electronics are connected to the test points $P_{T1}$-$P_{Tn}$, $P_{TREF}$ in the data cabinets of the conventional DRPI. The test points $P_{T1}$-$P_{Tn}$, $P_{TREF}$ provide access to the electrical signals from the plurality of detector coils $C_1$-$C_n$ and the reference voltage $V_{REF}$. The ADRPI electronics include a data acquisition unit in communication with an interface unit. Each control rod has one ADRPI electronics unit for each independent channel of the coil stack associated with the control rod. For example, a PWR having 53 control rods monitored by redundant DPRI systems (53 coil stacks with two independent channels) would have 106 ADPRI electronics (53 per data cabinet). In one embodiment, each ADRPI data acquisition unit has a number of analog inputs equal to the number of coils in a single channel plus an additional input for the reference line. The electronic signals produced by each DRPI coil are sampled by ADRPI data acquisition unit. In another embodiment, the ADRPI system monitors only the reference line and is limited to rod drop monitoring without adding high resolution rod position information. The interface unit is used to transmit the sampled data to the ADRPI processing unit located outside containment. The interface unit is selected to have sufficient data transmission speeds to send the sampled data to the ADRPI processing unit in real time. By way of example, one suitable device for performing the functions of the ADRPI data acquisition unit and the interface unit is the CompactRIO remote high speed interface system produced by National Instruments Corporation, which includes swappable I/O modules connected to an FPGA for acquiring various types of signals including the voltage and current signals used by the ADRPI system and a high speed interface allowing an external computer to communicate with the FPGA at data rates up to 50 MB/s. One skilled in the art will recognize that the general specifications for the ADRPI electronics are not intended to be limiting and that deviations intended to acquire sufficient data containing information from which the positions of the control rods to a single step can be derived are considered to remain with the scope and spirit of the appended claims.

Figure 4:
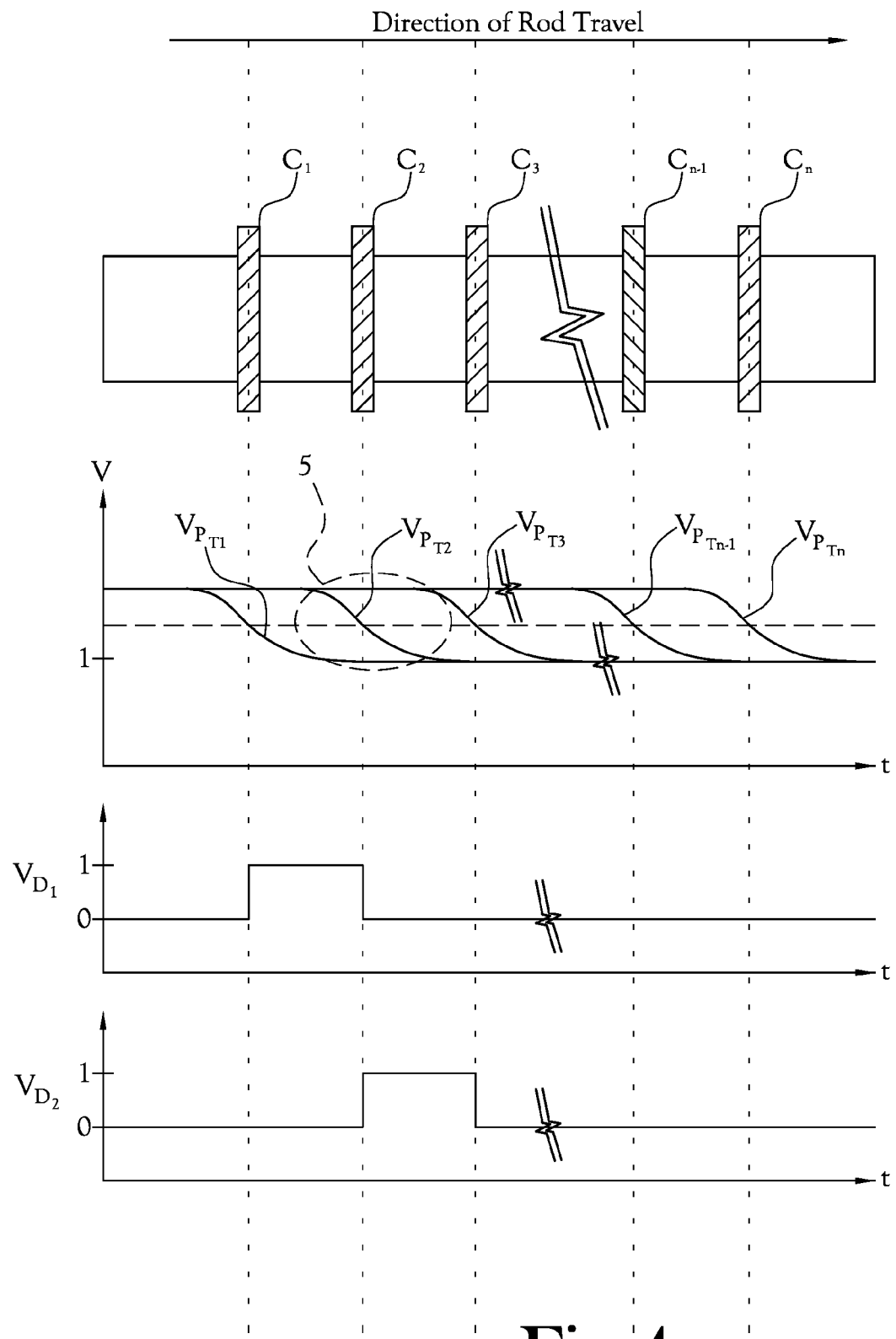
FIG. 4 illustrates idealized representations of the output from the detector coils and the corresponding outputs from the conventional DRPI electronics shown in relation to the movement a control rod.

To better appreciate the ADRPI system, a brief discussion of rod movement and control and of the operation of conventional DRPI systems is appropriate. FIG. 4 relates the electrical signals produced by the detector coils to rod movement and the output of a conventional DPRI system. In a conventional DPRI system, the detector coils $C_1$-$C_n$ are excited by a low-voltage ac source $V_{REF}$ generating a magnetic field around each of the detector coils. While undisturbed, the output voltage of each DRPI coil remains steady. As the drive rod approaches a DRPI coil, the magnetic field varies and the voltage induced in the DRPI coil changes. The output voltage of a DRPI coil is greatest when the drive rod is not interrupting the magnetic field, i.e., when the drive rod does not pass through the DRPI coil. As the drive rod passes through the DRPI coil, it interrupts the magnetic field and reduces the induced voltage. Thus, the output voltage of a DRPI coil is minimized when the drive rod passes through that DRPI coil. The outputs of neighboring detector coils are fed into a bank of differential amplifiers and logic components to produce the output signals of the conventional DRPI electronics. The changes in the DPRI electronics output signals indicate the movement of the drive rod into or out of a particular coil giving the approximate positions the control rods. As discussed in the background section, the position information provided by the conventional DRPI system is only accurate, at best, to within 6 steps. In other words, the precision of a conventional DRPI system is limited by the number of detector coils and their spacing.

The output of the conventional DRPI electronics are shown in FIG. 3 by signals $V_{D1}$, representing the voltage differential between the first coil $C_1$ and the second coil $C_2$, and $V_{D2}$, representing the voltage differential between the second coil $C_2$ and the third coil $C_3$, as a control rod 12 is withdrawn from the reactor core 14. For reference, the first coil $C_1$ is the bottom coil in the coil stack and the highest numbered coil $C_n$ is the top coil in the coil stack. As the control rod is withdrawn, the drive rod moves upward through the coil stack. Initially, the drive rod does not pass through any of the detector coils and the output voltage of all of the detector coils is maximized. At this point, all of the outputs of the conventional DRPI electronics are logical zeros. As the drive rod passes through the first coil $C_1$, the output voltage of the first coil $C_1$ falls while the output voltage of the second coil $C_2$ remains high. The resulting voltage differential produces a logical one at the first conventional DRPI electronics output $D_1$. The drive rod continues to rise and passes through the second coil $C_2$ causing the output voltage of the second coil $C_2$ to fall. At this point, the outputs voltages of the first coil $C_1$ and the second coil $C_2$ are both low. Because the voltage differential between the first coil $C_1$ and the second coil $C_2$ is no longer significant, the first conventional DRPI electronics output $D_1$ once again becomes a logical zero. However, a significant voltage differential exists between the second coil $C_2$ and the third coil $C_3$ because the voltage of the second coil $C_2$ is low while the voltage of the third coil $C_3$ remains high. This causes the second conventional DRPI electronics output $D_2$ to produce a logical one. Thus, each time the drive rod moves into or out of a DRPI coil, the resulting difference in voltage from the neighbor coil allows the most recently affected coil to be identified, thereby allowing the approximate position of the control rod to be determined with a resolution corresponding to the number of active detector coils.

A prototype of the ADPRI system was tested at the Farley nuclear power plant using a single channel of detector coils for one control rod when withdrawing the control rod 226 steps out of core, inserting the control rod 226 steps into the core, and during rod drop testing. FIGS. 5-11 show portions of the data obtained during testing of the prototype.

Figure 5:
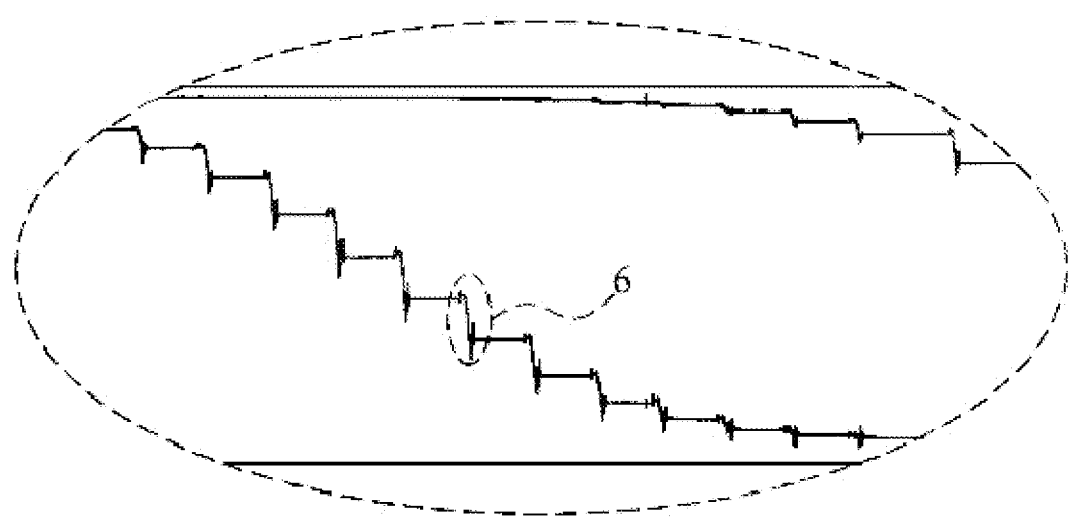
FIG. 5 illustrates the discernable features of the root-mean-square voltage ($V_{RMS}$) corresponding to the group steps of the control rod centered around a single coil using sampled data in place of one of the idealized representations of FIG. 4.
Figure 6:
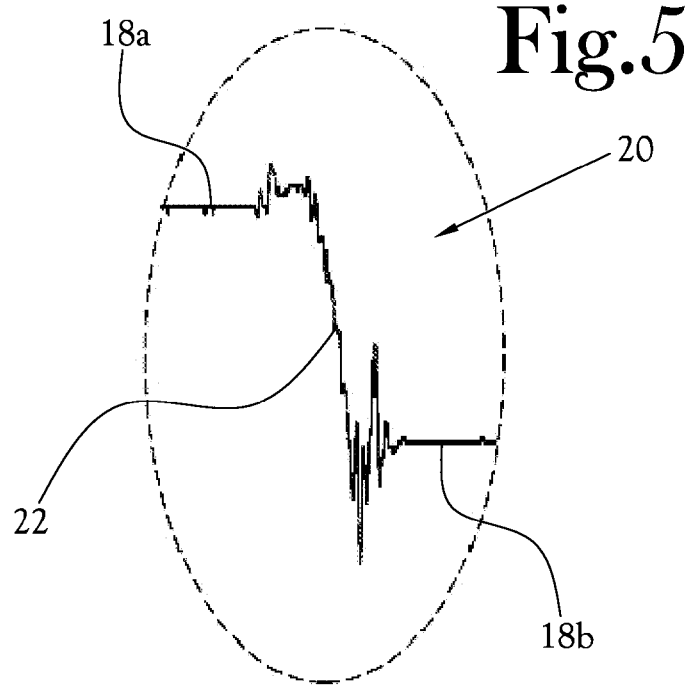
FIG. 6 illustrates a single step from the sample of FIG. 5 showing the discernable features of the signal corresponding to one step of the control rod in greater detail.
Figure 7:
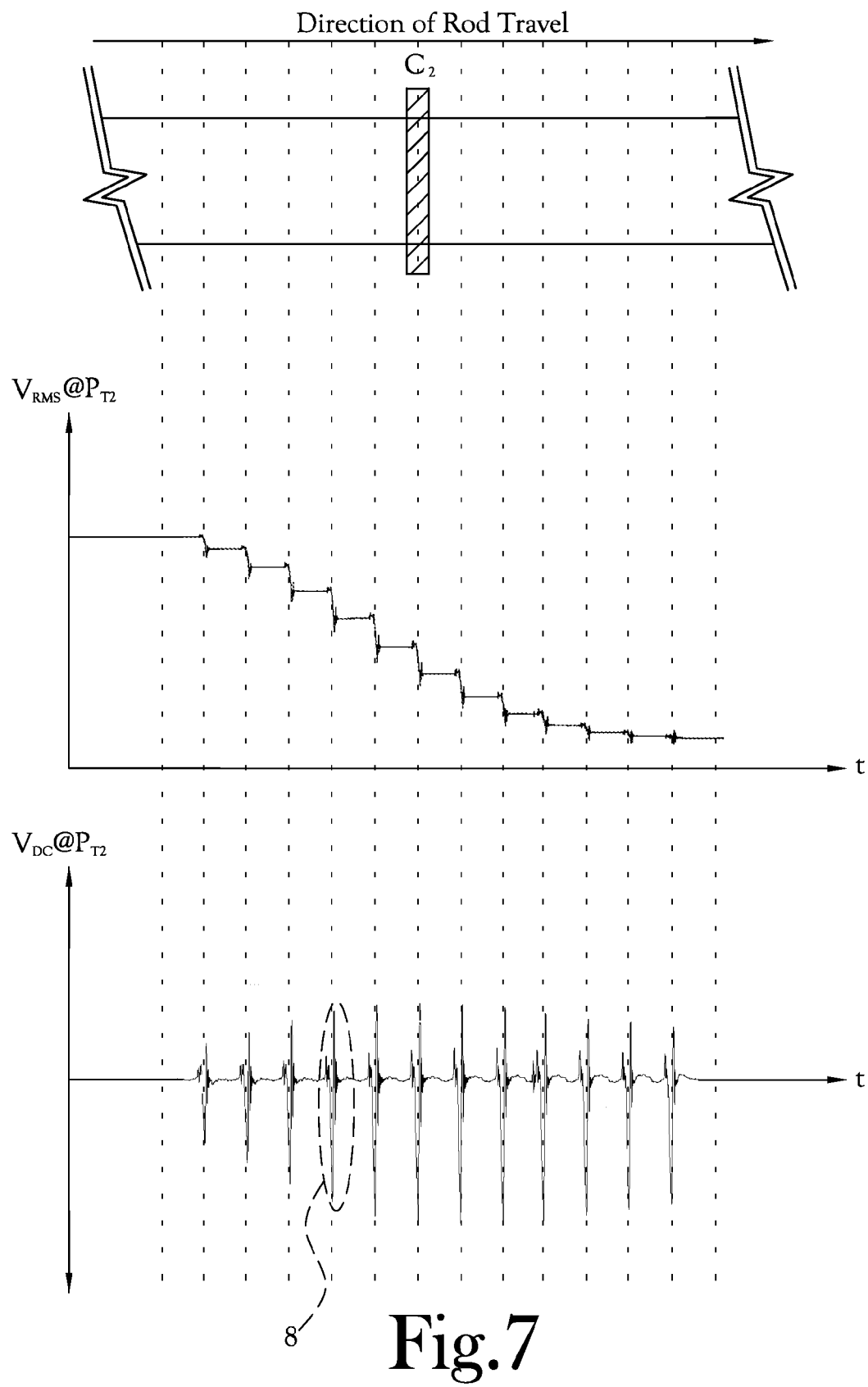
FIG. 7 shows the $V_{RMS}$ signal of FIG. 5 and the corresponding dc voltage signal obtained from the sampled data in relation to the movement the control rod.
Figure 8:
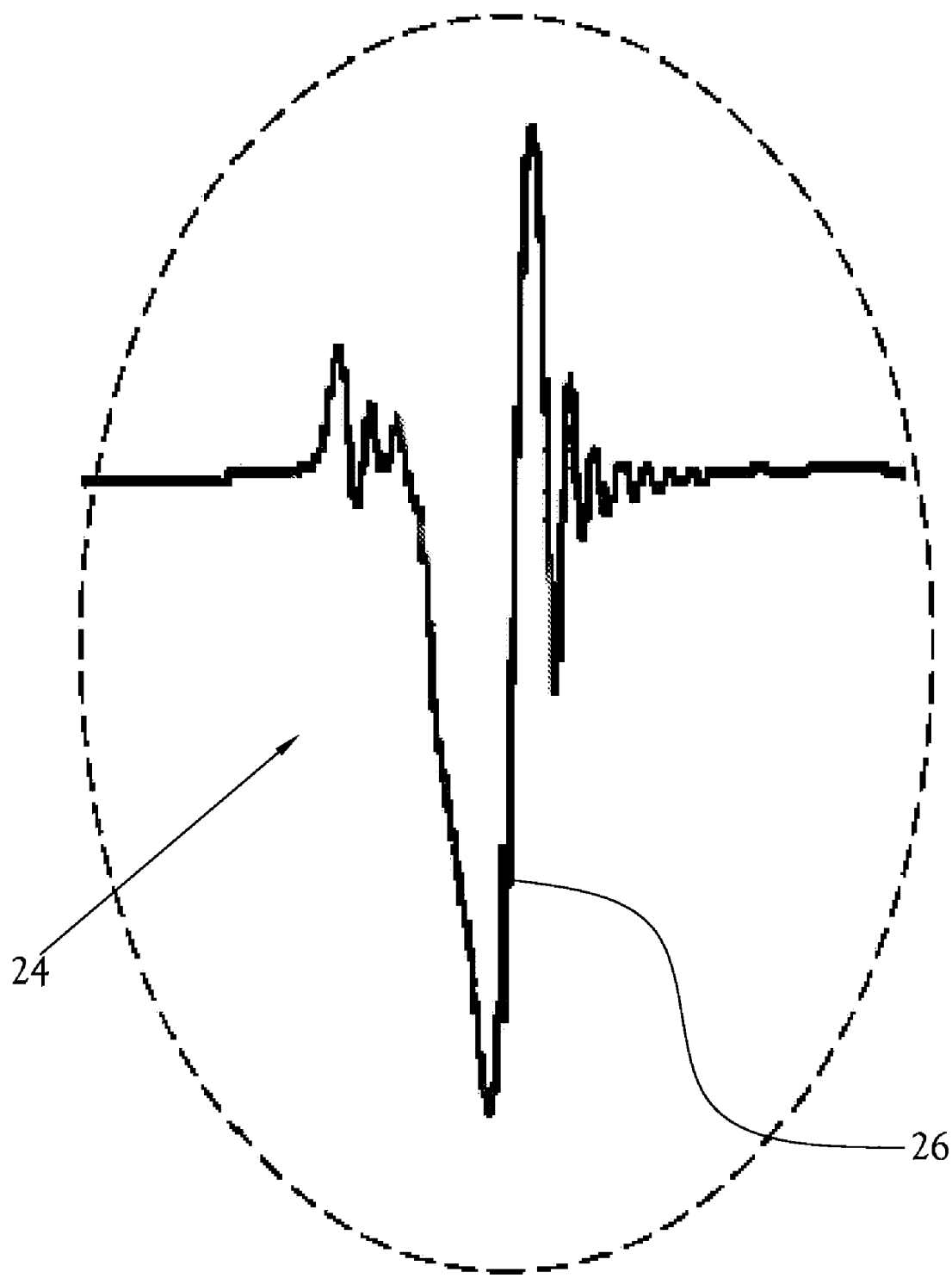
FIG. 8 illustrates features of the dc voltage signal from FIG. 7 corresponding to a single step in greater detail.

FIG. 5 substitutes a portion of the idealized signal shown in FIG. 4 with a root-mean-square (RMS) voltage obtained from the sampled data. FIG. 5 shows that every one of the 12 steps clearly produces a measureable change in the RMS voltage. More specifically, the RMS voltage obtained using the detector coil output shows a series of discrete steps that occur as a result of operation of the CRDM moving the drive rod one step at a time. In other words, the detector coil output produces a substantially constant RMS voltage 18a while the position of the control rod remains stationary. Each time the control rod moves, fluctuations 20 in the RMS voltage occur including an abrupt, discrete, and measurable change 22 in the amplitude of the RMS voltage. The amplitude change is followed by another period where the RMS voltage 18b remains substantially constant until the control rod moves again. These amplitude changes/fluctuations provide an identifiable characteristic introduced by and corresponding to movement of the control rod. FIG. 6 shows the RMS voltage change corresponding to a single step to illustrate the signal characteristics associated with movement of the control rod in greater detail. FIG. 7 relates the RMS voltage signal of FIG. 5 and a dc voltage signal obtained from the detector coil output to the movement of the drive rod through one coil. As with the RMS voltage signal, the dc voltage signal shows a voltage fluctuation corresponding to each step of the control rod. FIG. 8 shows the fluctuation 24 of the dc voltage signal for a single step of the control rod to more clearly illustrate the identifiable characteristics identifying movement of the control rod, namely a brief pulse or swing 26 from the dc voltage baseline having a minimum peak-to-peak voltage.

Unfortunately, this information is lost by conventional DRPI electronics during the differential analysis. However, the ADRPI system disclosed herein bypasses the conventional DRPI system and captures the raw DRPI coil outputs thereby preserving this information. The ADRPI system captures and processes this information allowing an accurate determination of the actual position of the drive rod with single step precision, effectively improving the resolution of the position information 6 times when compared to conventional RDPI systems. In one embodiment, the actual positions of the control rods are derived by accumulating the occurrences of the identifiable characteristics for each control rod starting from a known position. A count is added when a control rod moves upward, i.e., the detector coil output voltage increases, and a count is subtracted when a control rod moves downward, i.e., the coil output voltage decreases thereby allowing an accurate position determination with precision of a single step. In an alternate embodiment, the ADRPI system is calibrated by moving the control rods through their entire range of motion and associating the output voltages of the coils with a rod position value. The calibration process may be repeated and the results averaged, if necessary, to create an accurate set of reference voltages. In operation, the processing unit compares the measured outputs of the detector coils with the set of reference voltages to accurately identify the positions of the control rods thereby allowing an accurate position determination with the precision of a single step.

While time-domain analysis of the RMS voltage and the dc voltage signals derived from the DRPI coil outputs has been disclosed, the information relating to the movement of the drive rod may be discerned through analysis of other derived signals and/or analysis in other domains, such as the frequency domain.

The ADRPI system monitors rod drop times in the event of a rod drop event occurring during normal plant operation. Unlike the planned rod drop testing under the prior art, an actual rod drop event is unplanned and, therefore, the start time is an unknown. To ensure accurate timing, the ADRPI system monitors the reactor trip breaker. Monitoring the reactor trip breaker notifies the ADRPI processing unit when a reactor trip has occurred so that a rod drop trace can be generated and provides the ADRPI processing unit with a start time for the rod drop event.

Certain embodiments of the ADRPI system take advantage of the high resolution DPRI features described above, while other embodiments are completely independent of the resolution of the DRPI system and are suitable for use with conventional DRPI systems. In one embodiment of the ADRPI system, the ADRPI data acquisition unit samples the electrical signals from each of the detector coils. The ADRPI interface unit sends the sampled data to the ADRPI processing unit. As with the conventional rod drop testing, the passage of the drive rod through the detector coils induces a current in the coils. The signal induced during the rod drop is not the result of interaction of the drive rod with the magnetic field resulting from the excitation voltage. Thus, instead of occurring at the line frequency, the rod drop signal has a much lower frequency, for example, less than 20 hertz. In the event of a reactor trip, the ADRPI processing unit applies a low-pass filter to the sampled data to isolate the low frequency rod drop trace data. The cutoff frequency is a frequency rolling off before reaching the ac line frequency while retaining other desirable information, such as preventing the signal from dampening too quickly after the control rod reaches the bottom of the dashpot (i.e., rod recoil information).

Figure 9:
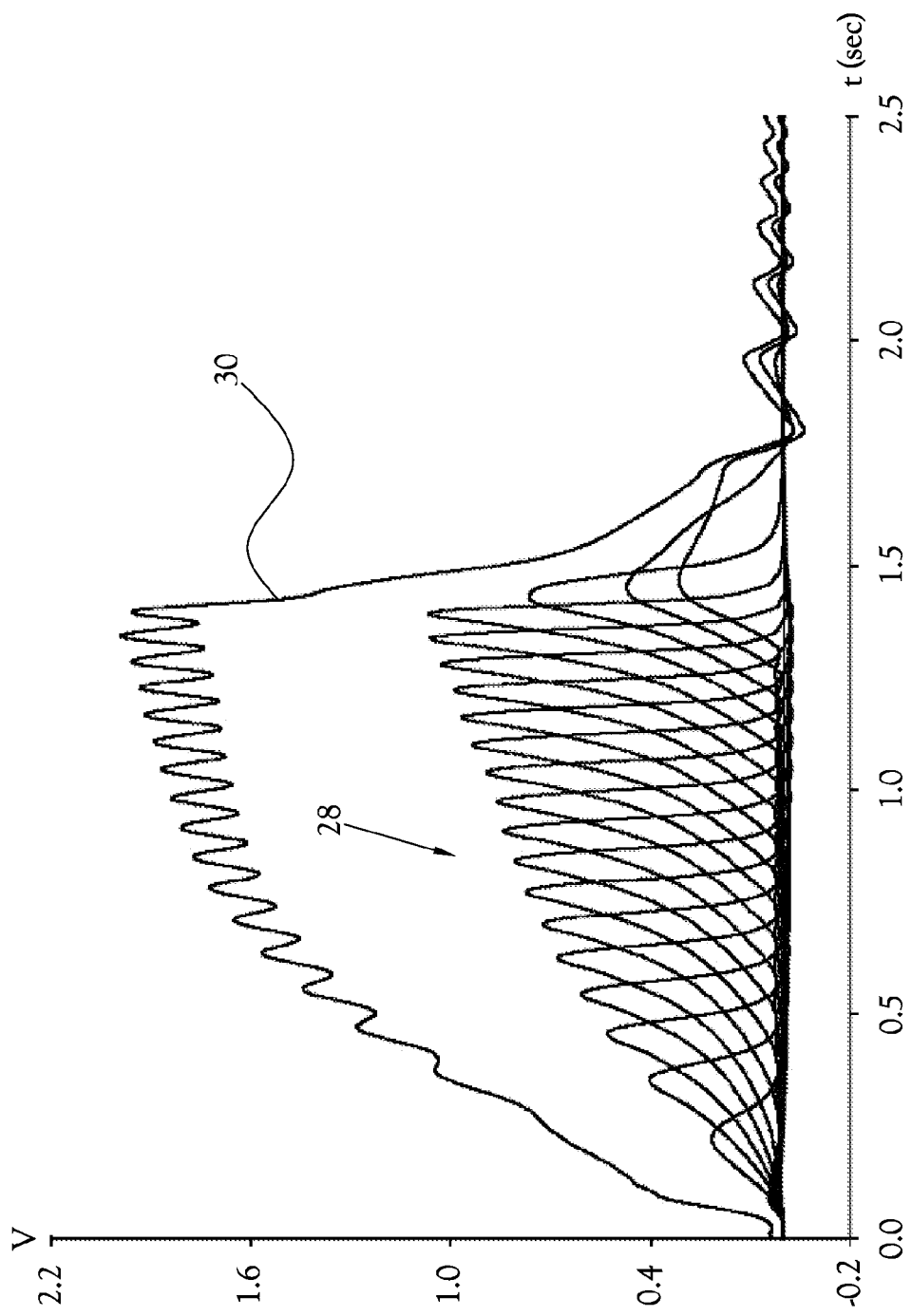
FIG. 9 is a graph of the individual output voltages of the detector coils induced by the passage of the drive rod and the combined voltages forming a typical rod drop trace.

FIG. 9 illustrates rod drop information from actual data collected by the present inventors from the detector coils of a DRPI system. Specifically, the low frequency component of the signal from each of the detector coils in response to the falling control rod is shown. As noted above, the technique underlying the '835 patent was the measurement of the analog signal across the entire coil stack taken at the reference test point $P_{TREF}$. Specifically, the signal is measured across the high side of the voltage reference using specialized, temporary connections that are not normally available through existing data cabinets. Thus, the composite low frequency information is not normally available using the available test points $P_{T1}$-$P_{Tn}$ and a permanent system would require substantial modification to the existing data cabinets.

In contrast to the '835 patent, the ADPRI system disclosed herein measures the signals of each detector coil available at the coil test points $P_{T1}$-$P_{Tn}$, which are on the low side of the voltage reference $V_{REF}$. By filtering out the ac line frequency component, the low frequency component 28 of the signal for each detector coil is obtained. To determine the rod drop time, the signals from at least the last detector coil are evaluated relative to the rod drop event start time obtained from the reactor trip breaker. The rod drop event stop time occurs when the amplitude of signal from the bottommost detector coil reaches a minimum value. Thus, using the rod drop event start time obtained from the reactor trip breaker and the rod drop event stop time derived from the sampled data, the ADRPI system is able to establish that the rod drop time for an actual reactor trip was within regulatory limits. In another embodiment, the low frequency component from each of the detector coils is evaluated relative to the rod drop event start time obtained from the reactor trip breaker to obtain the rod drop time. In this instance, the individual signals from the detector coils can be summed to produce the familiar rod drop trace 30, which is also shown in FIG. 9. This technique can be implemented independently of the rod position resolution improvements described herein and can be used with conventional DRPI systems.

In an alternate embodiment used where high resolution rod position information is available, the rod drop time is established from the position information obtained by the ADRPI system because the position information from the ADRPI system is not aggregated through differential analysis as with a conventional DRPI. As the drive rod falls and ceases affecting the magnetic field produced by the excitation power source $V_{REF}$, the output voltage of each detector coil is maximized. Accordingly, the rod drop event time is measured from the time when the reactor trip occurs to the time when the output voltage of the bottommost coil is maximized.

Figure 10:
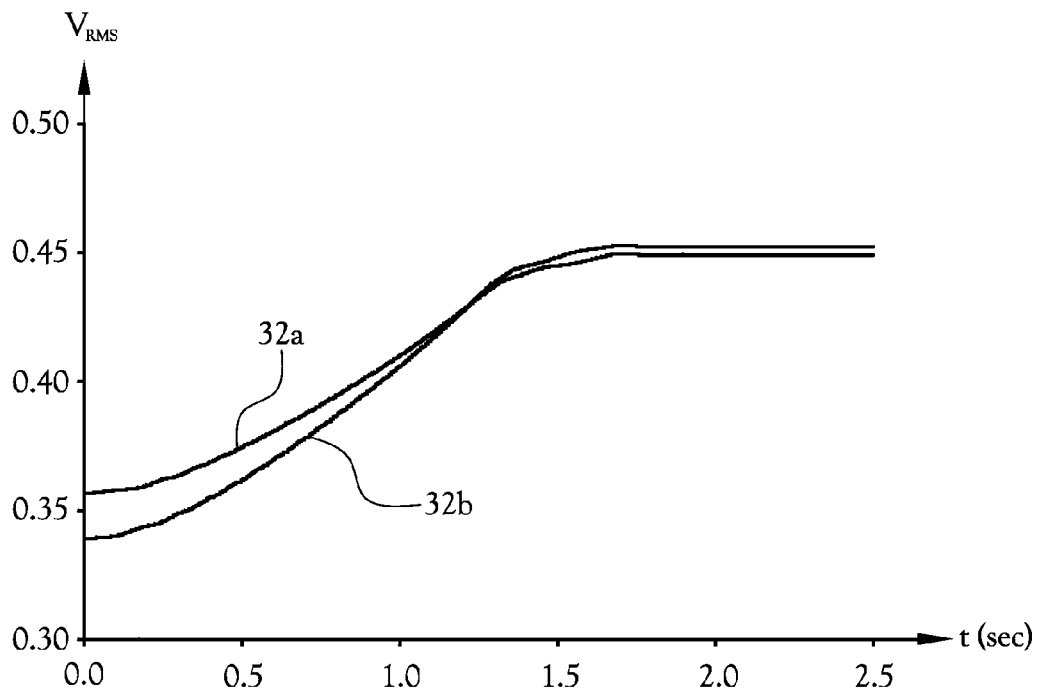
FIG. 10 is a graph of the RMS voltages across coil stack as the rod drops out of the detector coils during a rod drop.
Figure 11:
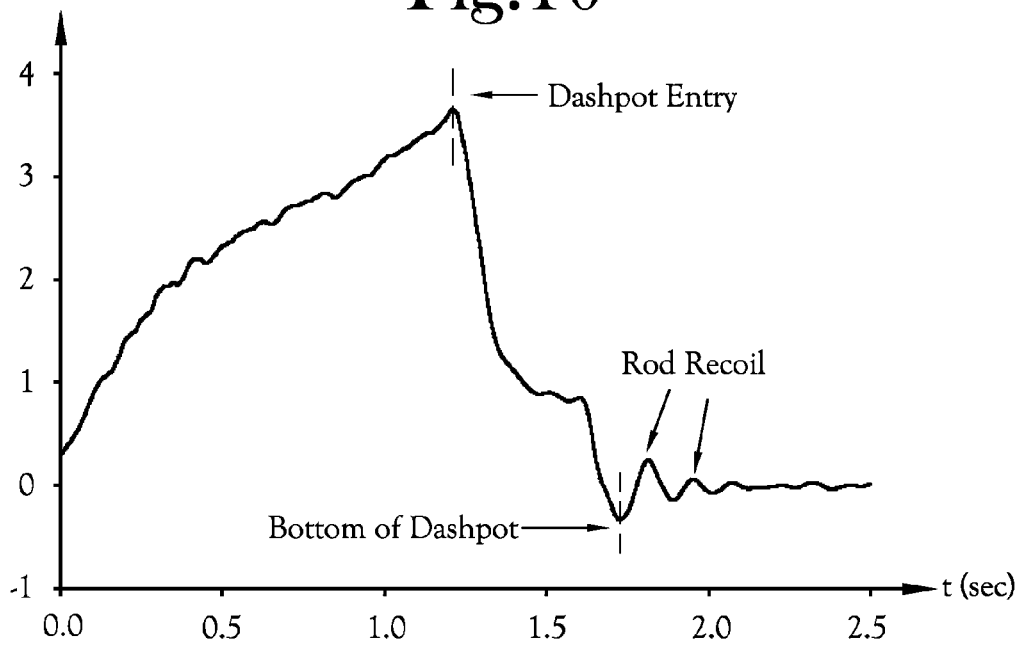
FIG. 11 plots the rod drop velocity obtained from the derivative of the combination of the RMS voltages from both channels.

In another embodiment, the rod drop information is obtained from the voltage across the DRPI coil stacks. FIG. 10 is a graph of the RMS voltage of channel A 32a and the RMS voltage of channel B 32b from one DPRI coil stack as the rod drops out of the detector coils during a rod drop obtained from the data collected by the present inventors. To obtain the rod drop velocity, the processing unit takes the derivative of the RMS voltage from either channel 32a, 32b or from the combination of the RMS voltages from both channels 32a, 32b. FIG. 11 plots the rod drop velocity obtained from the derivative of the combination of the RMS voltages from both channels 32a, 32b. The rod drop velocity is proportion to the rod drop trace normally obtained from the low frequency signals. The entry of the control rod into the dashpot is clearly represented by the peak and the time when the control rod reaches the bottom of the dashpot is clearly represented by the minimum amplitude shown. Also clearly visible are the declining peaks occurring after the control rod reaches the bottom of the dashpot that represent the rod recoil.

While not critical to the actual rod drop time measurement, the rod recoil information is useful and desirable to plant operators to indicate proper functioning of the collapsible coupling between the drive rod and the control rod. As previously mentioned in the discussion of embodiments where the ac line frequency component must be filtered to obtain the rod drop information, the cutoff frequency is selected to avoid dampening the low frequency components enough to mask or eliminate the rod recoil information.

Figure 12:
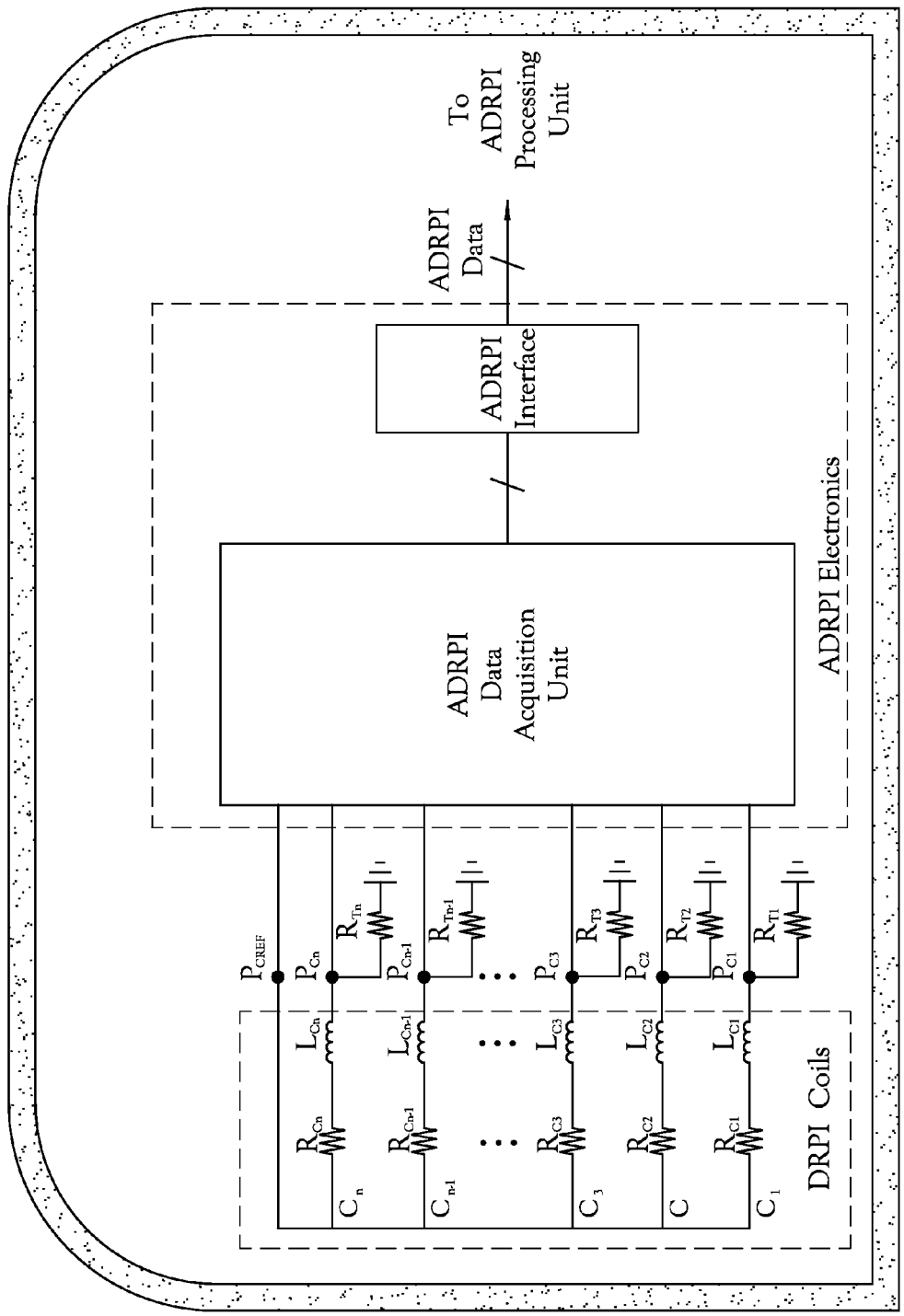
FIG. 12 is a block diagram of an alternate embodiment of the ADRPI system.

FIG. 12 illustrates an alternate embodiment of the ADRPI system that completely replaces conventional DRPI systems. In this embodiment, the ADRPI electronics are connected directly to the DPRI coils and communicate directly with the ADRPI processing unit located outside containment. The ADRPI system may also replace a conventional ARPI system; however, as previously discussed, the detector of a conventional ARPI system differs from the DRPI coils used for drive rod presence sensing. Accordingly, when replacing a conventional ARPI system, the ADRPI necessarily includes the DRPI detection coils.

Figure 13:
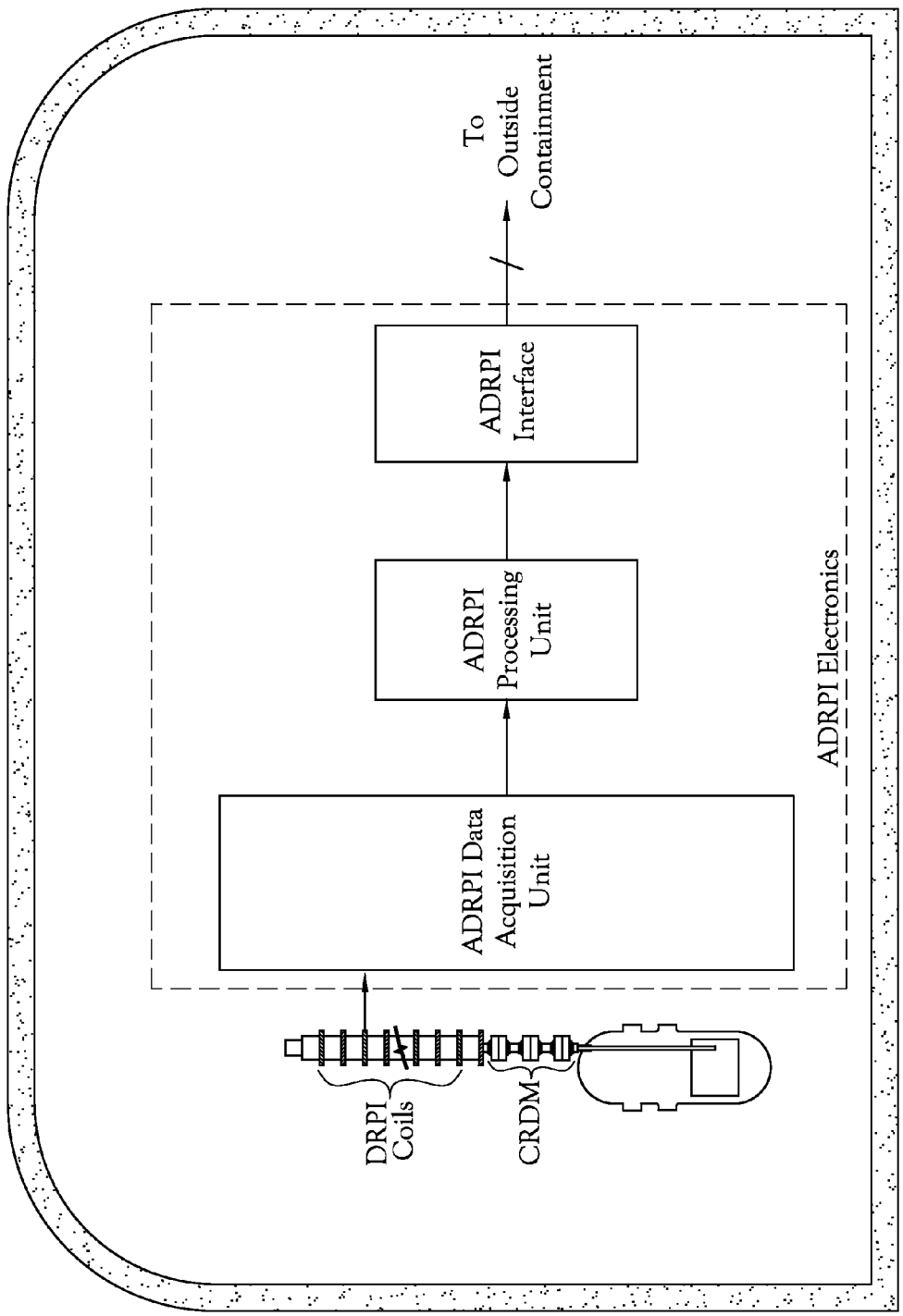
FIG. 13 is yet another embodiment of the ADRPI system.

FIG. 13 illustrates an alternate embodiment of the ADRPI system where some or all of the processing functions occur in the ADRPI electronics. In the embodiment of FIG. 10, the ADRPI electronics includes a processing unit receiving data from the ADRPI data acquisition unit. In one embodiment, the processing unit in the ADRPI electronics filters and/or calculates the rod drop information thereby reducing the amount of data that must be transferred to the main control system. In another embodiment, the processing unit in the ADRPI electronics assumes all of the processing functions thereby eliminating the need for the ADRPI system to provide a separate processing unit in the main control system. In this embodiment, the ADRPI electronics communicate directly with other control systems in the PWR, such as the reactor control of the main control system or the logic cabinet in the rod drive system, or simply communicates with the user interface. For example, in a system using the CompactRIO previously described, the FPGA calculates rod drop information. One skilled in the art will appreciate that the processing units described herein can be implemented using any number of logic components including controllers and processors without departing from the scope and spirit of the present invention.

From the foregoing description, it will be recognized by those skilled in the art that an ADRPI system capable of monitor rod drop times for actual reactor trips has been provided. The ADRPI system establishes a reference time from the reactor trip breaker to allow accurate timing of the rod drop time. When a reactor trip occurs, the signals from the detector coils are processed to derive rod drop time information thereby provide rod drop timing for actual reactor trip events. Finally, by using more than one technique to measure the rod drop times, the results can be compared and used to validate the rod drop time measurements.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A digital rod position indication system for measuring drop time of a control rod within a reactor following a reactor trip, the control rod being coupled to a drive rod, the reactor including a trip breaker, the control rod adapted to drop to core bottom when the reactor trip occurs, said digital rod position indication system comprising:
   a coil stack comprising a plurality of detection coils, each of said plurality of detection coils sensing the presence of the drive rod and producing an output signal in response to rod movement, each of said output signals having identifiable characteristics representative of positions of said control rod within a corresponding detection coil;

a data acquisition unit selectively electrically connected to a group of detection coils selected from said plurality of detection coils, said data acquisition unit sampling each of said output signals from said group of detection coils and producing a separate sampled output signal for each detection coil of said group of said plurality of detection coils; and a processing unit in communication with said data acquisition unit and the reactor trip breaker, said processing unit establishing a start time from the reactor trip breaker when the reactor trip occurs, said processing unit deriving the position of the control rod within the corresponding detection coil by analyzing said sampled output signals for said identifiable characteristics, said processing unit determining when the control rod reaches core bottom from said identifiable characteristics to establish a stop time, said processing unit providing a drop time for the control rod when a the reactor trip occurs, said drop time being the time period between said start time and said stop time.

2. The digital rod position indication system of claim 1 wherein said ac source operates at line frequency, said processing unit filters said sampled output signals to isolate said identifiable characteristics, said identifiable characteristics being drop signals induced in the detection coils by the drive rod moving through the detector coils, said drop signals occurring at frequencies lower than line frequency, said drop signals establishing said drop time.

3. The digital rod position indication system of claim 2 further comprising a low-pass filter, said processing unit applying said low-pass filter to said sampled output signals to obtain filtered signals, said low-pass filter having a cut-off frequency below line frequency.

4. The digital rod position indication system of claim 1, wherein an RMS voltage is obtained from said sampled output signals, said processing unit taking a derivative of said RMS voltage to obtain a rod drop velocity, said identifiable characteristics being peaks in said rod drop velocity.

5. The digital rod position indication system of claim 1, wherein said drop time is obtained from a combination of the voltage obtained from each detector coil of the plurality of detector coils.

6. The digital rod position indication system of claim 1, wherein said drop time is obtained from a composite voltage measured across the plurality of detector coils.

7. The digital rod position indication system of claim 3, said processing unit determining said stop time as the time when each amplitude of said filtered signals is substantially zero.

8. The digital rod position indication system of claim 1, said processing unit determining said stop time as the time when position information indicates that the control rod reaches core bottom.

9. A system for determining a drop time to core bottom for a control rod following a reactor trip triggering a reactor trip breaker, the control rod being coupled to a drive rod passing through a plurality of detector coils in a coil stack, said system comprising:

a data acquisition unit having a plurality of inputs selectively in electrical communication with a group of detection coils selected from the plurality of detection coils, said data acquisition unit collecting a set of sampled data from each detection coil in the group of the detection coils, each said set of sampled data representing electrical signals indicative of positions of the control rod within a corresponding detection coil produced by the corresponding detector coil of the group of the detection coils in response to rod movement; and a processing unit in communication with said data acquisition unit and in selective communication with the reactor trip breaker, said processing unit setting a start time upon triggering of the reactor trip breaker, said processing unit setting a stop time when each said set of sampled data indicates the control rod has reached core bottom following triggering of the reactor trip breaker, and said processing unit indicating said drop time following triggering of the reactor trip breaker based on said set of sampled data.

10. The system of claim 9, wherein the plurality of detector coils are energized by an ac source operating at line frequency, said processing unit filtering said sampled data to remove any signals at or above approximately line frequency to produce filtered data, said filtered data corresponding to drop signals induced in the plurality of detection coils by the drive rod moving through the plurality of detector coils, said drop signals falling to amplitudes of approximately zero when the control rod reaches core bottom.

11. The system of claim 1, further comprising a low-pass filter, said processing unit applying said low-pass filter to said sampled output signals to obtain said filtered data, said low-pass filter having a cut-off frequency below the line frequency.

12. The digital rod position indication system of claim 9, said processing unit determining that the control rod has reached core bottom based upon position information obtained from the plurality of detector coils.

13. The digital rod position indication system of claim 9, wherein an RMS voltage is obtained from said sampled output signals, said processing unit taking a derivative of said RMS voltage to obtain a rod drop velocity.

14. The digital rod position indication system of claim 9, wherein said drop time is obtained from a combination of the voltage obtained from each detector coil of the plurality of detector coils.

15. The digital rod position indication system of claim 9, wherein said drop time is obtained from a composite voltage measured across the plurality of detector coils.

* * * * *